J. SVAIGEL.
AUTOMOBILE SIGNAL.
APPLICATION FILED JUNE 13, 1919.

1,336,795. Patented Apr. 13, 1920.
2 SHEETS—SHEET 1.

Inventor
Joseph Svaigel,
By
Attorneys

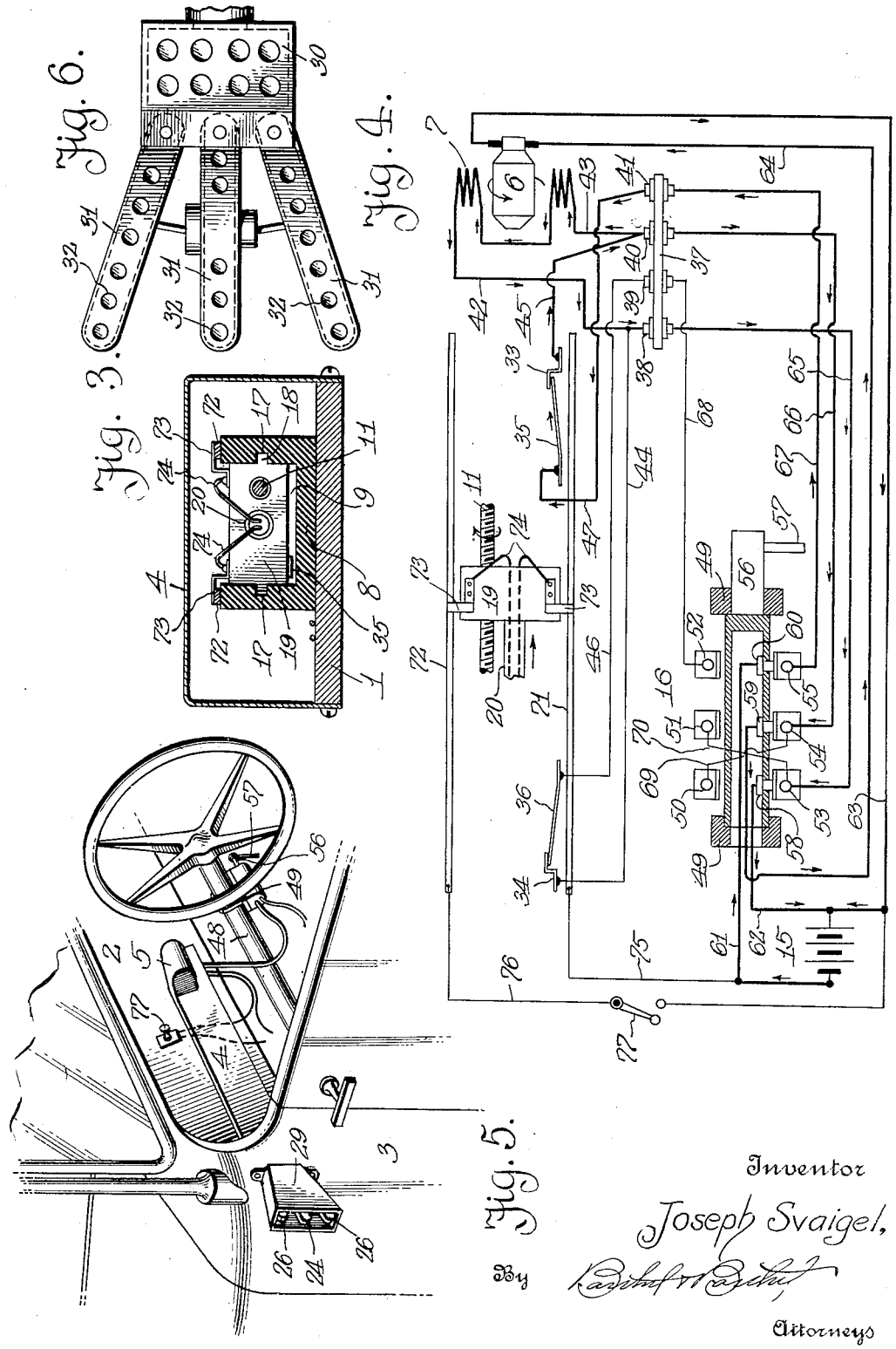

UNITED STATES PATENT OFFICE.

JOSEPH SVAIGEL, OF DETROIT, MICHIGAN.

AUTOMOBILE-SIGNAL.

1,336,795.                Specification of Letters Patent.    Patented Apr. 13, 1920.

Application filed June 13, 1919. Serial No. 303,957.

*To all whom it may concern:*

Be it known that I, JOSEPH SVAIGEL, a citizen of Hungary, residing at Detroit, in the county of Wayne and State of Michigan, have invented certain new and useful Improvements in Automobile-Signals, of which the following is a specification, reference being had therein to the accompanying drawings.

The primary object of my invention is to furnish an automobile or similar vehicle with a novel electrically operated signaling device, which will more or less represent the human arm when projected from the side of an automobile to indicate to a following automobile that the signal carrying automobile is about to stop or enter another lane of travel, and thus-avoid rear on collisions and other accidents incident to the stopping or changing of vehicular traffic.

Another object of my invention is to furnish an automobile body with an arm that may be electrically extended and retracted, and on the outer end of the arm are a plurality of fingers or members, imitating the fingers of a human hand, and these fingers or members are in closed formation when the arm is retracted or in an inactive position.

A further object of my invention is to employ a novel electrical means for imparting movement to the signal arm, and associated with such electrical means is a novel switch which may be located on the steering column assembly of an automobile, convenient to the chauffeur or operator of the automobile, so that the signal may be easily and quickly placed in operation.

A still further object of my invention is to provide a durable signal which will contribute to safe vehicular traffic, and the construction entering into the signal will be hereinafter specifically described and then claimed.

Reference will now be had to the drawings, wherein

Fig. 3 is a cross sectional view taken on the line III—III of Fig. 1;

Fig. 4 is a diagrammatic view of parts of the signal, showing the electrical connections;

Fig. 5 is a perspective view of a portion of an automobile showing the signal as applied thereto; and Fig. 6 is a side elevation of a modified form of hand member adapted to form part of a signal arm.

Figure 1:
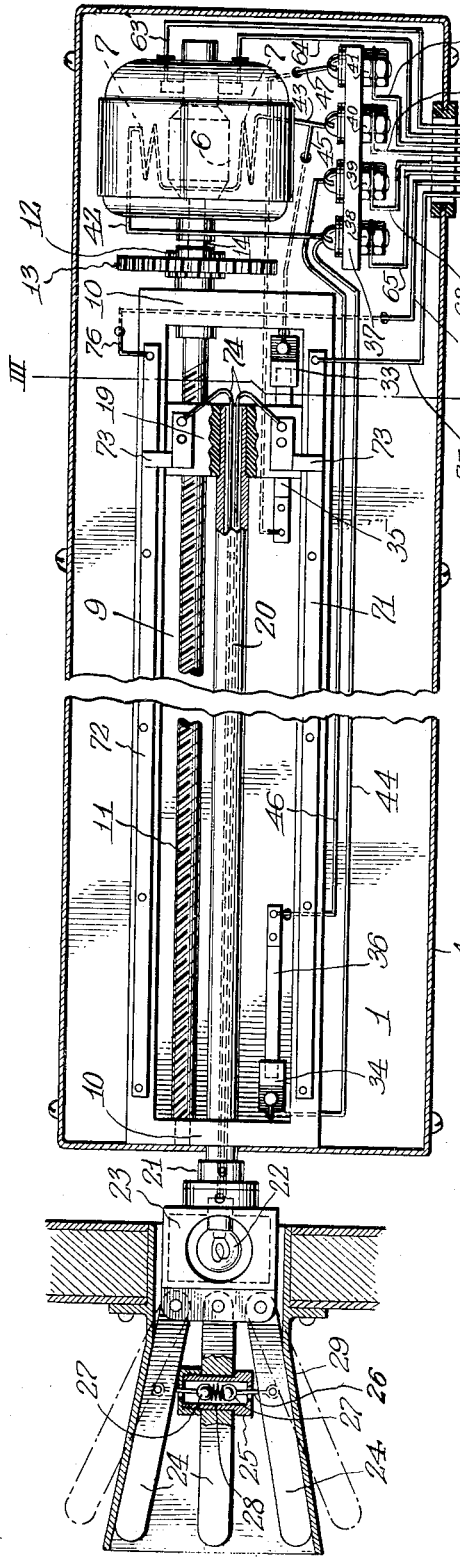
Figure 1 is a horizontal sectional view of the signal, partly broken away.
Figure 2:
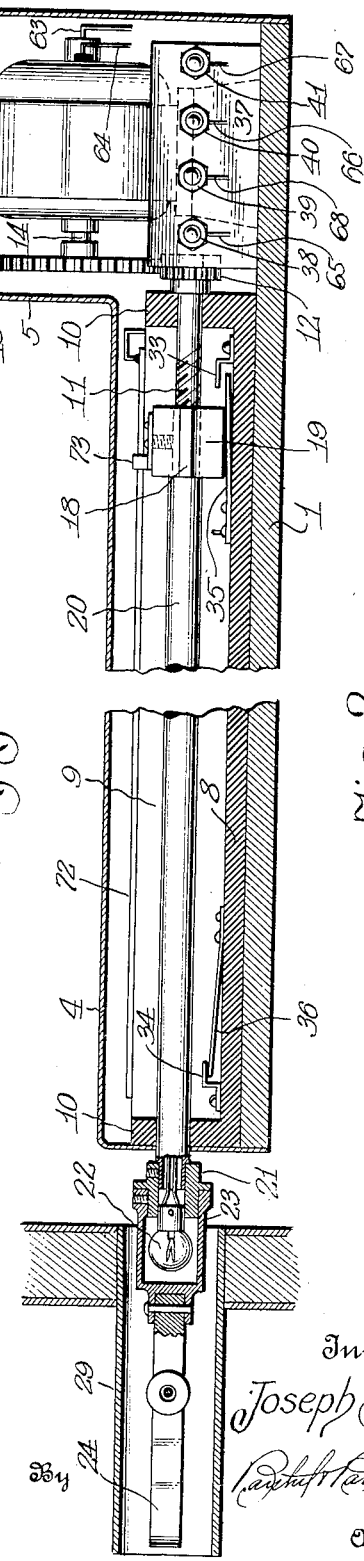
Fig. 2 is a longitudinal sectional view of the same.

In the drawings, the reference numeral 1 denotes a base plate that may be suitably secured to the dash or control board 2 of an automobile, adjacent the side wall 3 thereof, and suitably connected to the edges of the base 1 is a casing 4 having the inner end thereof enlarged, as at 5, to provide clearance for an electric motor, including an armature 6, fields 7 and such other appurtenances as are essential for an operative electric motor.

On the base 1 is a support 8, preferably made of insulation and this support has a large recess 9 with the end walls 10 thereof affording bearings for a screw 11 adjacent one of the side walls of the support 8. The inner end of the screw 11 has a small gear wheel 12 meshing with a large gear wheel 13 on the armature shaft 14 of the electric motor, and said electric motor is in circuit with a suitable source of electrical energy, as battery cells 15 and a switch generally designated 16, which permits of the operation of the electric motor being reversed so that the screw 11 may be revolved in either direction.

Side walls of the support 8 are provided with longitudinal grooves 17 for the side tongues 18 of a cross head 19 slidable in the recess 9, said cross head being in screw-threaded engagement with the screw 11, similar to a nut, so as to be shifted longitudinally of the support by a rotary movement of the screw 11, in either direction. The cross head 19 is preferably made of insulation and fixed in said cross head is the inner open end of a tubular signal arm 20 which has its outer end slidable through the outer end of the support 8 and the casing 4. The inner end of the signal arm 20 may have flat facets in the cross head 19 so as to prevent a rotative movement of the signal arm, or any suitable means may be employed for fixing the inner end of the signal arm relative to the cross head.

Mounted on the outer end of the signal arm 20 is a socket member 21 supporting an incandescent lamp 22 and inclosing said lamp is a hand member 23 provided with a plurality of pivoted fingers or members 24. As shown, the fingers 24 are three in number and the central or intermediate finger is provided with a two-part detachable housing 25 into which extends pivoted links 26 carried by the other fingers, said links having the inner ends thereof provided with ball heads 27 between which is interposed a coiled expansion spring 28 and the expansive force of said spring is sufficient to hold the outer fingers 24 extended or spread relative to the central or intermediate finger.

The hand member 23 extends through the wall 3 of the automobile body into a casing 29 carried by the outer side of said wall, and the casing is shaped to accommodate the fingers 24 and hold said fingers normally retracted, with the spring 28 under compression. As shown at the left hand side of Fig. 1, the casing 29 is flared or tapered so that the outermost fingers 24 will be frictionally held against the walls of said casing. When the signal arm is shifted to an outer active position the fingers 24 are carried out of the casing 29 and the upper and lower fingers released by the walls of the casing, so that the spring 28 may shift the upper and lower members relative to the intermediate finger, as shown by dot and dash lines in Fig. 1. The hand member on the outer end of the signal arm has more or less of a fan action, that is, when released it shifts or opens up to present a large area that will attract attention, and besides the hand member being illuminated by a single incandescent lamp, as shown in Fig. 1, it is possible to provide a hand member and fingers with a multiplicity of small incandescent lamps, and to this end there is illustrated in Fig. 6 a hollow hand member 30 and hollow fingers 31 having openings 32 through which rays of light may extend from illuminating means within the hand member 30 and the fingers 31.

In the recess 9 of the support 8, at each end thereof, are fixed contact members 33 and 34 normally engaged by resilient contact members 35 and 36 respectively, and these resilient contact members are in the path of the cross head 19 and are adapted to be depressed by said cross head to break the operating circuit of the electric motor.

On the base 1, adjacent the electric motor, is a support 37, preferably made of insulation, for binding posts 38, 39, 40 and 41. The binding posts 38 and 40 are connected by wires 42 and 43 to the fields 7 of the electric motor and by wires 44 and 45 to the fixed contact members 34 and 33 respectively. The binding posts 39 and 41 are connected by wires 46 and 47 respectively to the resilient contact members 36 and 35.

Suitably connected to the steering post or column 48 of the automobile is a switch casing 49 containing contact members 50, 51 and 52 which are in opposed relation to contact members 53, 54 and 55.

In the casing 49 is a rotary or oscillatory switch member 56 having a handle or crank 57 at one end of the switch casing so that it may be easily rotated or adjusted. The switch member 56 is preferably hollow and is provided with contact members 58, 59 and 60. The contact member 60 is connected by a wire 61 to the positive pole of the battery cells 15, and the contact member 58 is connected by a wire 62 to the negative pole of said battery cells. This same side of the battery cells is connected by a wire 63 to one of the brushes of the motor armature 6 and the other brush connected by a wire 64 to the contact member 59.

The contact members 53, 54 and 55, are connected to the binding posts 38, 40 and 41, by wires 65, 66, and 67 respectively.

The contact member 52 is connected by a wire 68 to the binding post 39; the contact member 50 to the contact member 54 by wire 69, and the contact member 51 to the contact member 53 by a wire 70.

On the side walls of the support 8 are longitudinally disposed contact strips 71 and 72 engaged by contact members 73 of the cross head 19, and the contact members 73 have lead in wires 74 that extend through the tubular signal arm 20 to the incandescent lamp 22. The contact strips 71 and 72 are connected by wires 75 and 76 to the battery cells 15 and a switch 77 is associated with the wire 76 so that the circuit to the incandescent lamp 22 may be manually controlled. As shown in Fig. 5, it is preferable to locate the switch 77 on the dash or control board 2 of the automobile, and at night this switch may be closed so as to establish a circuit for the incandescent lamp 22 whenever the signal is operated for display purposes.

The electric motor is in parallel with the source of electrical energy and the circuit through the fields of the motor may be reversed so that the motor may be used to revolve the screw 11 in a desired direction to reciprocate the cross head 19. As shown in the diagrammatic view, Fig. 4, the screw 11 is being revolved to retract the signal arm 20 and just as said signal arm reaches its innermost position, the cross head 19 engages the resilient contact member 35 and breaks the circuit which has been illustrated by heavy lines and arrows in Fig. 4. When the switch member 56 is rotated to place the contact members 58, 59 and 60 in engagement with the contact members 50, 51 and 52, then the operation of the electric motor is reversed and the screw 11 shifts the cross head 19 to extend the tubular signal arm 20. As the hand member passes out of the casing 29, the upper and lower fingers 24 are extended. This is the operation during the daytime, and for night use the switch 77 is closed so that the incandescent lamp 22 may be illuminated.

The operating circuit as shown is from the positive side of the battery by wire 61 to contact members 60 and 55, wire 67 to binding post 41, wire 47 to the resilient contact member 35 which engages the fixed contact member 33. From this fixed contact member by wire 45 to the binding post 40, by wire 43 to the fields 7 of the electric motor, wire 42 to the binding post 38, wire 65 to the contact members 53 and 58 and by wire 62 to the negative side of the battery. The circuit for the brushes of the electric motor is from the positive side of the battery through wire 61, contact members 60 and 55, wire 67 to binding post 41, wire 47 through the contact members 35 and 33 by wire 45 to the binding post 40, wire 66 through contact members 54 and 59, wire 64 to the brushes of the electric motor and by wire 63 to the positive side of the battery.

Without describing other circuits in connection with the signaling device, it is thought that the operation and utility thereof will be understood without further description, and while in the drawings there are illustrated the preferred embodiments of my invention, it is to be understood that the structural elements are susceptible to such variations and modifications as fall within the scope of the appended claim.

What I claim is:—

In an automobile signal, the combination of a support, a revoluble screw carried thereby, a cross head slidable in said support adapted to be reciprocated by a rotary movement of said screw, a tubular signal arm carried by said cross head and adapted to be moved in and out of said support, a signal on the outer end of said arm, an incandescent lamp carried by said signal, electrical connections through said signal arm to said lamp, contact strips on said support, contact members on said cross head engaging said contact strips and connected to said connections within said signal arm, and means adapted for rotating said screw in either direction.

In testimony whereof I affix my signature in the presence of two witnesses.

JOSEPH SVAIGEL.

Witnesses:
KARL H. BUTLER,
ANNA M. DORR.